US011668794B2

(12) United States Patent
Pandey et al.

(10) Patent No.: US 11,668,794 B2
(45) Date of Patent: Jun. 6, 2023

(54) SENSOR CALIBRATION (71) Applicant: Ford Global Technologies, LLC, Dearborn, MI (US)

(72) Inventors: Gaurav Pandey, College Station, TX (US); Weifeng Xiong, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 589 days.

(21) Appl. No.: 16/735,742

(22) Filed: Jan. 7, 2020

(65) Prior Publication Data

US 2021/0208245 A1  Jul. 8, 2021

(51) Int. Cl.
*G01S 7/40* (2006.01)
*G01S 13/86* (2006.01)
*G01S 7/48* (2006.01)
*H01Q 15/18* (2006.01)

(52) U.S. Cl.
CPC .......... *G01S 7/4004* (2013.01); *G01S 7/4808* (2013.01); *G01S 13/865* (2013.01); *G01S 13/867* (2013.01); *H01Q 15/18* (2013.01)

(58) Field of Classification Search
CPC .... G01S 7/4004; G01S 7/4808; G01S 13/865; G01S 13/867; H01Q 15/18
See application file for complete search history.

(56) References Cited

U.S. PATENT DOCUMENTS

2012/0320190 A1* 12/2012 Natroshvili ............... G06T 7/85
                                                           348/135
2017/0060254 A1*  3/2017 Molchanov ............ G01S 7/415
2018/0231654 A1    8/2018 Bilik et al.
2019/0215486 A1*  7/2019 Venshtain ................ H04N 5/33
2019/0231654 A1    8/2019 Zickerman et al.
(Continued)

FOREIGN PATENT DOCUMENTS

CN    110021046 A    7/2019
EP      3525000 A1    8/2019

OTHER PUBLICATIONS

Horn, B., et al., "Closed-form Solution of Absolute Orientation Using Orthonormal Matrices," Department of Electrical Engineering, University of Hawaii, 36 pages.
(Continued)

*Primary Examiner* — Thomas Ingram
(74) *Attorney, Agent, or Firm* — Frank A. MacKenzie; Bejin Bieneman PLC (57) ABSTRACT An extrinsic-calibration system includes at least one target and a computer. Each target includes three flat surfaces that are mutually nonparallel and a corner at which the three surfaces intersect. The computer is programmed to estimate a first set of relative positions of the corner in a first coordinate frame from a first sensor, the first set of relative positions corresponding one-to-one to a set of absolute positions of the at least one target; estimate a second set of relative positions of the corner in a second coordinate frame from a second sensor, the second set of relative positions corresponding one-to-one to the set of absolute positions; and estimate a rigid transformation between the first coordinate frame and the second coordinate frame based on the first set of relative positions and the second set of relative positions.

20 Claims, 4 Drawing Sheets

(56) References Cited

U.S. PATENT DOCUMENTS

| | | | |
|---|---|---|---|
| 2020/0192368 A1* | 6/2020 | Bonanni | G01C 21/3844 |
| 2020/0284887 A1* | 9/2020 | Wachter | G01S 7/497 |
| 2020/0326410 A1* | 10/2020 | Vu | G01S 17/931 |
| 2020/0393560 A1* | 12/2020 | Han | G01S 7/52046 |
| 2021/0295718 A1* | 9/2021 | Robert | G08G 5/0047 |

OTHER PUBLICATIONS

Horn, B., et al., "Closed-form Solution of Absolute Orientation Using Quaternions," J. Opt. Soc. Am., vol. 4, No. 4, Apr. 19687, 14 pages.
Arun, K., et al., "Least Squares Fitting of Two 3-D Point Sets," IEEE Transactions on Pattern Analysis and Machine Intelligence, vol. PAMI-9, No. 5, Sep. 1987, 3 pages.

\* cited by examiner

SENSOR CALIBRATION

BACKGROUND

Modern vehicles often include sensors. Some sensors detect the external world, e.g., objects and/or characteristics of surroundings of the vehicle, such as other vehicles, road lane markings, traffic lights and/or signs, pedestrians, etc. Examples of such sensors include radar sensors, scanning laser range finders, light detection and ranging (LIDAR) devices, and image processing sensors such as cameras.

When vehicles include multiple sensors for detecting the external world, a vehicle computer typically combines the data from the multiple sensors together, a process called sensor data fusion or sensor fusion. Sensor fusion typically includes combining data from disparate sources together with the goal that the resulting data has less uncertainty than if the data from each source were used individually, e.g., in creating a unified model of the surrounding environment of the vehicle. The sensor fusion can be performed with one or more algorithms, e.g., Kalman filter, central limit theorem, Bayesian networks, Dempster-Shafer, and/or convolutional neural networks, etc. The vehicle computer can use the fused sensor data for autonomous or semi-autonomous operation of the vehicle.

A process that can be important for sensor fusion is extrinsic calibration of the sensors. Extrinsic calibration is determining the relative position and orientation between a sensor and an object external to the sensor, which can be one of the other sensors. The relative position and orientation of two sensors is important for combining data from the two sensors in a consistent manner.

DETAILED DESCRIPTION

Described herein is a system and process for extrinsic calibration of sensors on a vehicle. The system and process provide a computationally efficient and reliable manner to extrinsically calibrate the sensors, including because the process admits of a closed-form solution. The system and process can obviate the need for data association, i.e., finding common landmarks in data from two sensors in order to combine the data. Thus, a computer performing the extrinsic calibration as described herein may be able to avoid expending the computational resources for data association, i.e., performing the calculations for the extrinsic calibration in fewer computational steps. Moreover, because the process uses a closed-form solution, the computer can perform the calculations in a predetermined number of computational steps, rather than using algorithm for approximating a solution that converges in an unknown and often large number of computational steps. By comparing points in different coordinate frames, the process can be more accurate than data association, which can introduce reprojection errors between points and a surface, and the process can be more accurate than comparing sets of planes in different coordinate frames, which can also introduce reprojection errors. The process is thus a more accurate way to perform an extrinsic calibration of two sensors. The system and process can be used for multiple different types of sensors at once, e.g., radar sensors, cameras, and/or LIDAR sensors.

An extrinsic-calibration system includes at least one target, a first sensor spaced from the at least one target, a second sensor rigidly connected to the first sensor, and a computer communicatively coupled to the first sensor and the second sensor. Each target including three flat surfaces that are mutually nonparallel and a corner at which the three surfaces intersect. The computer is programmed to estimate a first set of relative positions of the corner in a first coordinate frame from the first sensor, the first set of relative positions corresponding one-to-one to a set of absolute positions of the at least one target; estimate a second set of relative positions of the corner in a second coordinate frame from the second sensor, the second set of relative positions corresponding one-to-one to the set of absolute positions; and estimate a rigid transformation between the first coordinate frame and the second coordinate frame based on the first set of relative positions and the second set of relative positions.

Estimating the rigid transformation may include performing least squares optimization.

Estimating the rigid transformation may include determining the rigid transformation that minimizes an aggregation of errors from, for each absolute position, a difference between (a) the corresponding relative position from one of the first set or the second set and (b) application of the rigid transformation to the corresponding relative position from the other of the first set or the second set.

Each target may include a reflector at the corner. The reflector may include three reflector surfaces each mounted to a different one of the three flat surfaces, and the three reflector surfaces may intersect at the corner.

The first sensor may be a radar sensor.

The three flat surfaces may each include a checkerboard pattern. Estimating the second set of relative positions may include determining an intersection point of the three flat surfaces.

The second sensor may be one of a camera or a LIDAR sensor.

A computer includes a processor and a memory storing instructions executable by the processor to estimate a first set of relative positions of a corner of at least one target in a first coordinate frame from a first sensor, each at least one target including three flat surfaces that are mutually nonparallel and the corner at which the three surfaces intersect, the first set of relative positions corresponding one-to-one to a set of absolute positions of the at least one target; estimate a second set of relative positions of the corner in a second coordinate frame from a second sensor, the second sensor rigidly connected to the first sensor, the second set of relative positions corresponding one-to-one to the set of absolute positions; and estimate a rigid transformation between the first coordinate frame and the second coordinate frame based on the first set of relative positions and the second set of relative positions.

Estimating the rigid transformation may include performing least squares optimization. The least squares optimization may be a nonlinear least squares optimization.

Estimating the rigid transformation may include determining the rigid transformation that minimizes an aggregation of errors from, for each absolute position, a difference between (a) the corresponding relative position from one of the first set or the second set and (b) application of the rigid transformation to the corresponding relative position from the other of the first set or the second set.

Each target may include a reflector at the corner. The reflector may include three reflector surfaces each parallel to a different one of the three flat surfaces, and the three reflector surfaces may intersect at the corner.

The first sensor may be a radar sensor.

The three flat surfaces may each include a checkerboard pattern. Estimating the second set of relative positions may include determining an intersection point of the three flat surfaces.

The second sensor may be one of a camera or a LIDAR sensor.

A method includes providing at least one target, each target including three flat surfaces that are mutually nonparallel and a corner at which the three surfaces intersect; providing a first sensor and a second sensor rigidly connected together; estimating a first set of relative positions of the corner to the first sensor in a first coordinate frame based on data from the first sensor, the first set of relative positions corresponding one-to-one to a set of absolute positions of the at least one target; estimating a second set of relative positions of the corner to the second sensor in a second coordinate frame based on data from the second sensor, the second set of relative positions corresponding one-to-one to the set of absolute positions; and estimating a rigid transformation between the first coordinate frame and the second coordinate frame based on the first set of relative positions and the second set of relative positions.

With reference to the Figures, a vehicle 30 includes a plurality of sensors 32, 34, 36 including at least one radar sensor 32, at least one camera 34, and at least one LIDAR sensor 36. An extrinsic-calibration system 38 (see FIG. 2) is used to perform an extrinsic calibration for a first sensor 32, 34, 36 of the sensors 32, 34, 36 and a second sensor 32, 34, 36 of the sensors 32, 34, 36. For the purposes of this disclosure, "extrinsic calibration" is defined as determining the relative position and orientation between a sensor 32, 34, 36 and an object external to the sensor 32, 34, 36, which can be another sensor 32, 34, 36. The extrinsic-calibration system 38 includes at least one target 40, the first sensor 32, 34, 36 spaced from the at least one target 40, the second sensor 32, 34, 36 rigidly connected to the first sensor 32, 34, 36, and a computer 42 communicatively coupled to the first sensor 32, 34, 36 and the second sensor 32, 34, 36. Each target 40 includes three flat surfaces 44 that are mutually nonparallel and a corner 46 at which the three flat surfaces 44 intersect. The computer 42 is programmed to estimate a first set of relative positions of the corner 46 in a first coordinate frame from the first sensor 32, 34, 36, the first set of relative positions corresponding one-to-one to a set of absolute positions of the at least one target 40; estimate a second set of relative positions of the corner 46 in a second coordinate frame from the second sensor 32, 34, 36, the second set of relative positions corresponding one-to-one to the set of absolute positions; and estimate a rigid transformation between the first coordinate frame and the second coordinate frame based on the first set of relative positions and the second set of relative positions.

Figure 1:
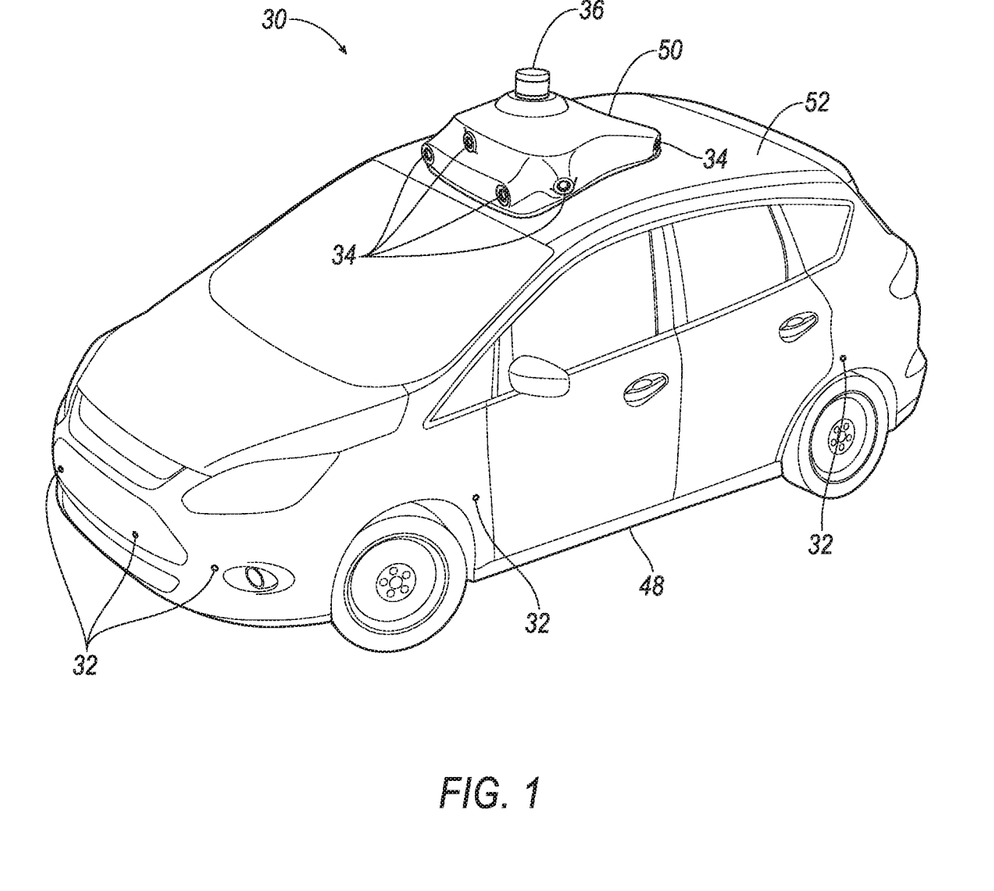
FIG. 1 is a perspective view of an example vehicle.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a body 48. The vehicle 30 may be of a unibody construction, in which a frame and the body 48 of the vehicle 30 are a single component. The vehicle 30 may, alternatively, be of a body-on-frame construction, in which the frame supports the body 48 that is a separate component from the frame. The frame and the body 48 may be formed of any suitable material, for example, steel, aluminum, etc.

A housing 50 for some or all of the sensors 32, 34, 36 is attached to the body 48 of the vehicle 30, e.g., to a roof 52. For example, the housing 50 may be shaped to be attached to the roof 52, e.g., may have a shape matching a contour of the roof 52. The roof 52 can provide the sensors 32, 34, 36 with an unobstructed field of view of an area around the vehicle 30. The housing 50 may be formed of, e.g., plastic or metal.

Each sensor 32, 34, 36 is rigidly connected to each other sensor 32, 34, 36 via the housing 50 and/or the body 48. For the purposes of this disclosure, "A is rigidly connected to B" is defined as A is directly or indirectly attached to B so that the location and orientation of B relative to A is fixed. For example, as shown in FIG. 1, the radar sensors 32 are mounted the body 48 of the vehicle 30 below a beltline of the vehicle 30, the cameras 34 are mounted to the housing 50 inside the housing 50, and the LIDAR sensor 36 is mounted on top of the housing 50.

The radar sensors 32 each include a transmitter that produces radio waves or microwaves and a receiving antenna to receives the waves. The waves produced by the transmitter reflect off of objects in the environment back to the receiving antenna. The radar sensors 32 can detect a distance to an object based on a time of flight of the waves.

The cameras 34 can detect electromagnetic radiation in some range of wavelengths. For example, the cameras 34 may detect visible light, infrared radiation, ultraviolet light, or some range of wavelengths including visible, infrared, and/or ultraviolet light. For another example, the cameras 34 may be a time-of-flight (TOF) cameras, which include a modulated light source for illuminating the environment and detect both reflected light from the modulated light source and ambient light to sense reflectivity amplitudes and distances to the scene.

The LIDAR sensors 36 detect distances to objects by emitting laser pulses at a particular wavelength and measuring the time of flight for the pulse to travel to the object and back. The LIDAR sensors 36 can be rotating scanners that emit and receives pulses in a 360° field of view.

Figure 2:
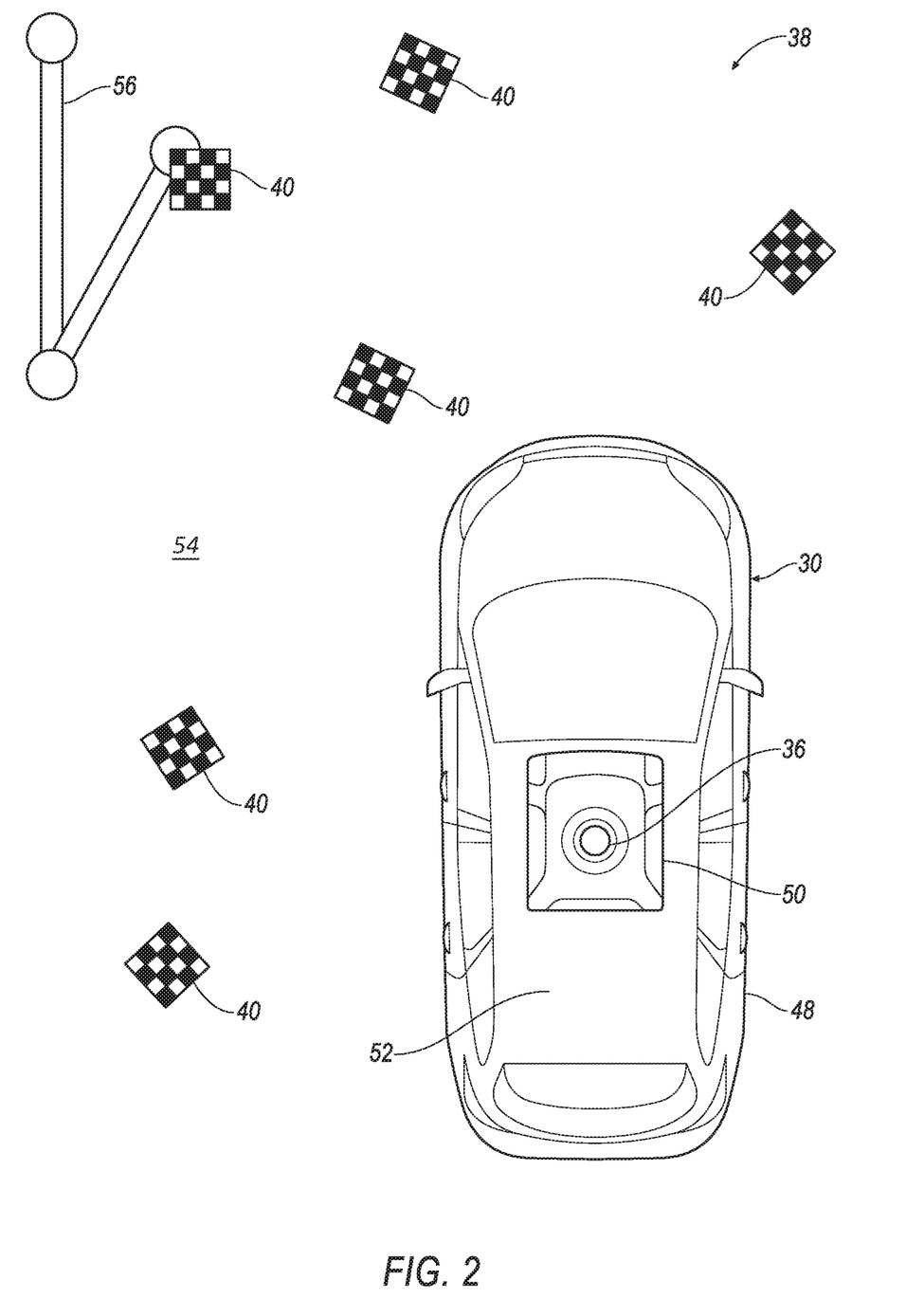
FIG. 2 is a top diagrammatic view of the vehicle and targets while performing an extrinsic calibration for sensors of the vehicle.

With reference to FIG. 2, a testing environment 54 includes the at least one target 40. The vehicle 30 can be positioned at a testing position relative to the at least one target 40 (or if the at least one target 40 is mobile, relative to a beginning position of the at least one target 40) in the testing environment 54 for performing an extrinsic calibration of the sensors 32, 34, 36 using the at least one target 40. For example, the testing environment 54 can include a plurality of targets 40. The targets 40 can be mounted at fixed locations in the testing environment 54 that are within the fields of view of at least some of the sensors 32, 34, 36 when the vehicle 30 is at the testing position. For another example, the testing environment 54 can include one target 40 that is movable around the testing environment 54, e.g., by a robotic arm 56, as shown in FIG. 2, and/or on one or more tracks, etc. The robotic arm 56 can move the target 40 to a plurality of positions at which the target 40 is within the fields of view of at least some of the sensors 32, 34, 36 when the vehicle 30 is at the testing position. For another example, the testing environment 54 can include a plurality of targets 40, at least some of which are movable.

Figure 3:
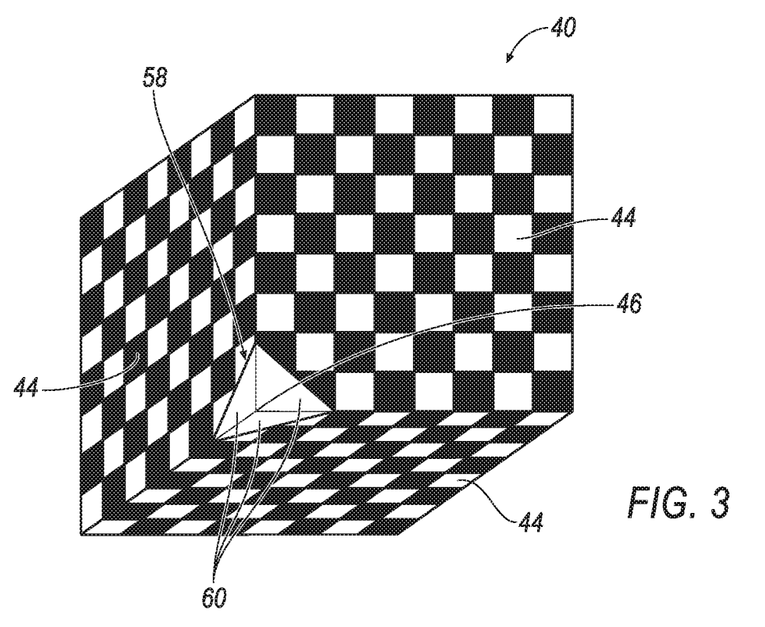
FIG. 3 is a perspective view of one of the targets.

With reference to FIG. 3, each target 40 includes the three flat (i.e., substantially planar) surfaces 44 that are mutually nonparallel and the corner 46 at which the three flat surfaces 44 intersect. That the three flat surfaces 44 are mutually nonparallel means that no flat surface 44 is parallel to a different flat surface 44 of the target 40, and thus the three flat surfaces 44 define the corner 46 at which the three flat surfaces 44 intersect. For example, as shown in FIG. 3, the three flat surfaces 44 can be mutually orthogonal, i.e., each flat surface 44 forms a right angle with each other flat surface 44 of the target 40. The three flat surfaces 44 in the present example each include a checkerboard pattern, i.e., a pattern of alternating colors in a grid of squares. The two colors are chosen to be highly contrasting with each other as seen by the sensor 32, 34, 36, e.g., black and white for one of the cameras 34, highly thermally reflective and minimally thermally reflective if one of the sensors 32, 34, 36 is a thermal camera, etc. For each flat surface 44, the checkerboard pattern faces in a direction orthogonal to that flat surface 44, and the other two flat surfaces 44 extend from the flat surface 44 in the same direction. The three flat surfaces 44 can form a partial cube, and the checkerboard patterns can face toward the inside of the cube. The corner 46 is therefore an inside corner.

Each target 40 includes a reflector 58 at the corner 46. The reflector 58 includes three reflector surfaces 60 each mounted to a different one of the three flat surfaces 44. For example, each reflector surface 60 can be mounted to the respective flat surface 44 in a position in which the reflector surface 60 is in substantially a same plane as the respective flat surface 44. The three reflector surfaces 60 intersect at the corner 46. Each reflector surface 60 can be coplanar with a different one of the three flat surfaces 44. The reflector surfaces 60 can be triangular. The reflector surfaces 60 are a highly reflective material with respect to the radar sensors 32, e.g., electrically conductive materials such as metals.

Figure 4:
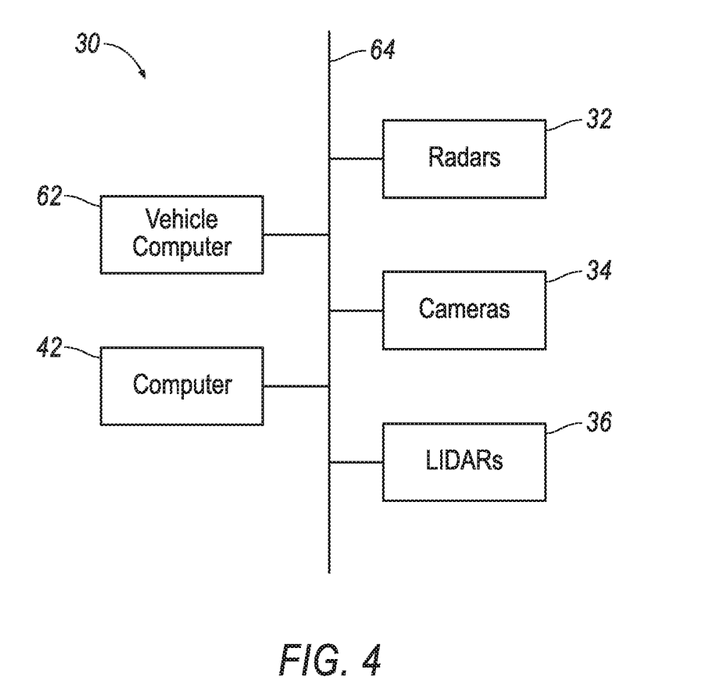
FIG. 4 is a block diagram of the vehicle.

With reference to FIG. 4, the vehicle 30 includes a vehicle computer 62. The vehicle computer 62 is a microprocessor-based computing device, e.g., an electronic controller or the like. The vehicle computer 62 includes a processor, a memory, etc. The memory of the vehicle computer 62 includes media for storing instructions executable by the processor as well as for electronically storing data and/or databases.

The vehicle computer 62 may transmit and receive data through a communications network 64 of the vehicle 30 such as a controller area network (CAN) bus, Ethernet, WiFi, Local Interconnect Network (LIN), onboard diagnostics connector (OBD-II), and/or by any other wired or wireless communications network. The vehicle computer 62 may be communicatively coupled to the sensors 32, 34, 36, the computer 42, and other components via the communications network 64, and the computer 42 can be communicatively coupled to the sensors 32, 34, 36 via the communications network 64.

The computer 42 is a microprocessor-based computing device, e.g., an electronic controller or the like. The computer 42 includes a processor, a memory, etc. The memory of the computer 42 includes media for storing instructions executable by the processor as well as for electronically storing data and/or databases. The computer 42 may be part of the vehicle 30 or may be part of a separate component connectable to the vehicle 30. For example, the computer 42 can be an electronic control module (ECM) of the vehicle 30. For another example, the computer 42 can be the same as the vehicle computer 62. For another example, the computer 42 can be part of a portable device that is communicatively couplable to the vehicle 30, e.g., via an OBD-II port connected to the communications network 64.

Figure 5:
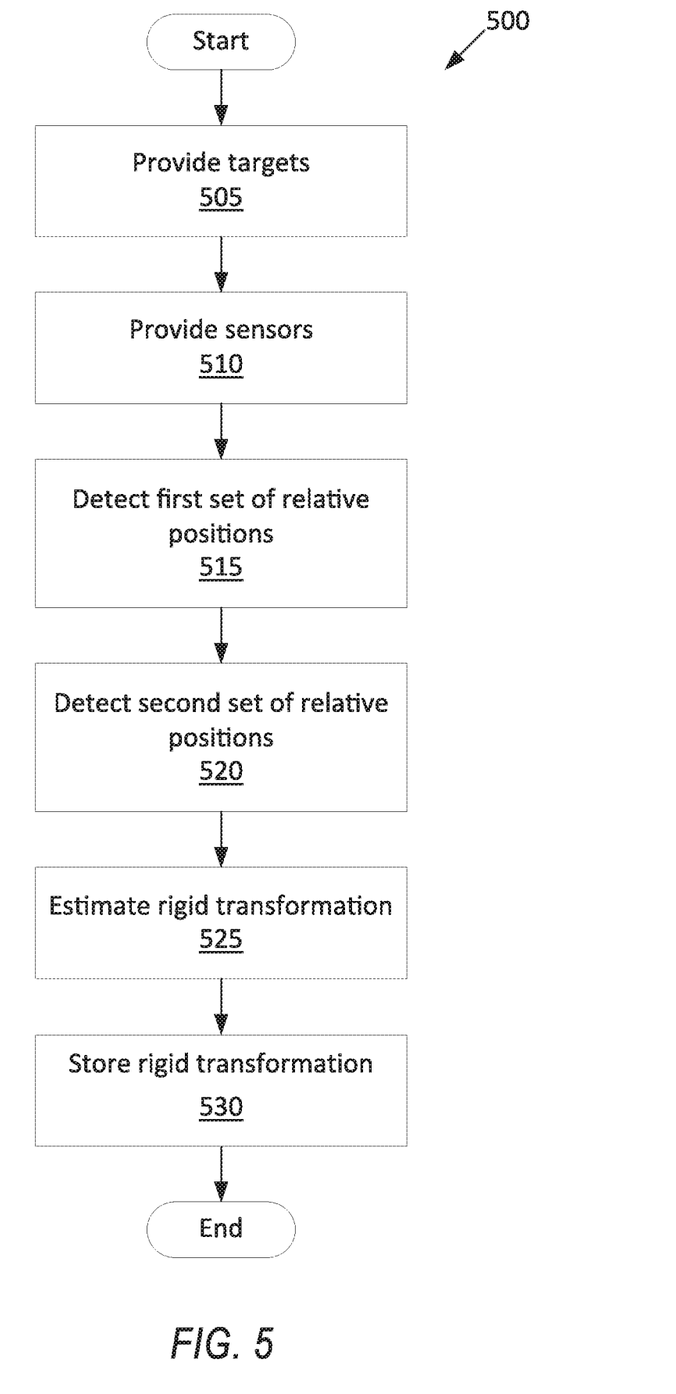
FIG. 5 is a process flow diagram of an example process for extrinsically calibrating the sensors.

FIG. 5 is a process flow diagram illustrating an exemplary process 500 for extrinsically calibrating the sensors 32, 34, 36. As a general overview of the process 500, the targets 40 and the vehicle 30 including the sensors 32, 34, 36 are provided, the computer 42 receives data from a first sensor 32, 34, 36 of the sensors 32, 34, 36 and estimates a first set of relative positions of the corner(s) 46 in a first coordinate frame, the computer 42 receives data from a second sensor 32, 34, 36 of the sensors 32, 34, 36 and estimates a second set of relative positions of the corner(s) 46 in a second coordinate frame, the computer 42 estimates a rigid transformation between the first coordinate frame and the second coordinate frame, and the vehicle computer 62 stores the rigid transformation to use while operating the vehicle 30. The process 500 can be performed multiple times for the same vehicle 30 using a different first sensor 32, 34, 36 and second sensor 32, 34, 36 from the sensors 32, 34, 36 of the vehicle 30. The memory of the computer 42 stores executable instructions for performing steps 515-530 of the process 500.

For the purposes of this disclosure, a "coordinate frame" includes a three-dimensional coordinate system for locating positions in space with coordinates relative to a position, e.g., relative to an origin of the three-dimensional coordinate system represented as (0, 0, 0). In the illustrated examples, the first coordinate frame is located relative to the first sensor 32, 34, 36, e.g., with its origin (0, 0, 0) at the first sensor 32, 34, 36, an x-axis extending straight forward from the first sensor 32, 34, 36, a y-axis extending left from the first sensor 32, 34, 36, and a z-axis extending upward from the first sensor 32, 34, 36. The second coordinate frame is located relative to the second sensor 32, 34, 36, e.g., with its origin (0, 0, 0) at the second sensor 32, 34, 36, an x-axis extending straight forward from the second sensor 32, 34, 36, a y-axis extending left from the second sensor 32, 34, 36, and a z-axis extending upward from the second sensor 32, 34, 36. The first set of relative positions and the second set of relative positions both correspond one-to-one to the same set of absolute positions of the corner(s) 46. For the purposes of this disclosure, an "absolute position" is a physical position independent of any particular coordinate frame, and a "relative position" is a physical position measured in a particular coordinate frame.

The process 500 begins in a block 505, in which at least one target 40 is provided in the testing environment 54. The at least one target 40 can be one or more movable targets 40, multiple stationary targets 40, or a combination of movable and stationary targets 40. If the targets 40 are stationary, the targets 40 are fixed in the testing environment 54 in the set of absolute positions, one target 40 for each absolute position in the set. If the targets 40 are movable, e.g., by the robotic arm 56, then the targets 40 are moved through the set of absolute positions while the first and second sensors 32, 34, 36 collects data of the first set of relative positions and the second set of relative positions in the blocks 515 and 520 below. The set of absolute positions is chosen in advance so that the target 40 at each absolute position is in the fields of view of the first and second sensors 32, 34, 36 and to be sufficiently dispersed to provide a robust extrinsic calibration.

Next, in a block 510, the first sensor 32, 34, 36 and the second sensor 32, 34, 36 are provided. For example, the vehicle 30 including the sensors 32, 34, 36 to be tested is moved to the testing position in the testing environment 54. The first sensor 32, 34, 36 and the second sensor 32, 34, 36 are two different sensors 32, 34, 36 of the vehicle 30. The first sensor 32, 34, 36 and the second sensor 32, 34, 36 can be different types of sensors 32, 34, 36 (where a sensor type refers to a sensing medium or signal, e.g., LIDAR detects reflected laser light beams, radar detects reflected radio frequency beams, a camera captures a visual image, etc.). For example, the first sensor 32, 34, 36 can be one of the radar sensors 32, and the second sensor 32, 34, 36 can be one of the cameras 34 or LIDAR sensors 36. As stated above, the first sensor 32, 34, 36 and the second sensor 32, 34, 36 are rigidly connected together via the housing 50 and/or the body 48 of the vehicle 30. When the vehicle 30 is in the testing position, the first sensor 32, 34, 36 and the second sensor 32, 34, 36 are spaced from the targets 40, and all the targets 40 are within the field of view of the first sensor 32, 34, 36 and within the field of view of the second sensor 32, 34, 36.

Next, in a block 515, the computer 42 receives data from the first sensor 32, 34, 36 and estimates the first set of relative positions $\{^iP_a\}_{i=1\ldots N}$ in the first coordinate frame, in which i is an index of positions, N is a total number of positions, a designates the first coordinate frame, and $^iP_a$ is the ith position in the first coordinate frame. The position $^iP_a$ is a three-dimensional point $(x_i, y_i, z_i)_a$ in the first coordinate frame. The first set of relative positions $\{^iP_a\}_{i=1\ldots N}$ corresponds one-to-one to the set of absolute positions $\{^iP\}_{i=1\ldots N}$ of the at least one target 40; i.e., a first relative position $^1P_a$ corresponds to a first absolute position $^1P$, a second relative position $^2P_a$ corresponds to a second absolute position $^2P$, and so on for all N pairings of relative and absolute positions. The computer 42 receives data from the first sensor 32, 34, 36 from which the computer 42 can determine the first set of relative positions $\{^iP_a\}_{i=1\ldots N}$. For example, if the first sensor 32, 34, 36 is one of the radar sensors 32, the corners 46 of the targets 40 (at which the reflectors 58 are located) are the most reflective points in the field of view of the first sensor 32, 34, 36, so the first set of relative positions $\{^iP_a\}_{i=1\ldots N}$ are the points in the field of view of the first sensor 32, 34, 36 with reflectivity above a threshold chosen to be sufficiently high that only the corners 46 exceed the threshold. For another example, if the first sensor 32, 34, 36 is one of the cameras 34 or the LIDAR sensors 36, the computer 42 detects the three flat surfaces 44 for each target 40, calculates planes corresponding to each of the three flat surfaces 44, and determines the point of intersection of the three planes as the relative position of the corner 46. The checkerboard pattern of the flat surfaces 44 aids detection by the first sensor 32, 34, 36 if the first sensor 32, 34, 36 is a camera 34 by providing a pattern that is easily recognizable by a pattern recognition algorithm, from which the computer 42 can determine a location and orientation of each flat surface 44.

Next, in a block 520, the computer 42 receives data from the second sensor 32, 34, 36 and estimates the second set of relative positions $\{^iP_b\}_{i=1\ldots N}$ in the second coordinate frame, in which b designates the second coordinate frame and $^iP_b$ is the ith position in the second coordinate frame. The block 520 can be performed simultaneously with the block 515 above. The position $^iP_b$ is a three-dimensional vector $(x_i, y_i, z_i)_b$ in the second coordinate frame. The second set of relative positions $\{^iP_b\}_{i=1\ldots N}$ corresponds one-to-one to the set of absolute positions $\{^iP\}_{i=1\ldots N}$ of the at least one target 40; i.e., a first relative position $^1P_b$ corresponds to the first absolute position $^1P$, a second relative position $^2P_b$ corresponds to the second absolute position $^2P$, and so on for all N pairings of relative and absolute positions. The computer 42 receives data from the second sensor 32, 34, 36 from which the computer 42 can determine the second set of relative positions $\{^iP_b\}_{i=1\ldots N}$, as described above with respect to the block 515.

Next, in a block 525, the computer 42 estimates the rigid transformation $^aT_b$ between the first coordinate frame and the second coordinate frame based on the first set of relative positions $\{^iP_a\}_{i=1\ldots N}$ and the second set of relative positions $\{^iP_b\}_{i=1\ldots N}$. The rigid transformation $^aT_b$ is an operator that converts a relative position $^iP_a$ in the first coordinate frame to a relative position $^iP_b$ in the second coordinate frame, i.e., $^iP_b = {^aT_b}\,^iP_a$, or vice versa. The rigid transformation can be a 3×4 matrix $[^aR_b\ t_{ab}]$ composed of a 3×3 rotational transformation matrix $^aR_b$ from the first coordinate frame to the second coordinate frame and a 3×1 translational transformation matrix $t_{ab}$ from the first coordinate frame to the second coordinate frame. Estimating the rigid transformation $^aT_b$ based on points, i.e., the first set of relative positions $\{^iP_a\}_{i=1\ldots N}$ and the second set of relative positions $\{^iP_b\}_{i=1\ldots N}$, provides a more accurate solution than, e.g., using reprojection errors between points and a surface or comparing sets of planes in different coordinate frames. Estimating the rigid transformation $^aT_b$ includes determining the rigid transformation $^aT_b$ that minimizes an aggregation of errors from, for each absolute position $^iP$, a difference between (a) the corresponding relative position from one of the first set or the second set and (b) application of the rigid transformation to the corresponding relative position from the other of the first set or the second set, as done by, e.g., this equation:

$$^aT_b = [^aR_b\ t_{ab}] = \operatorname{argmin} \sum_{i=1}^{N} \left\| ^aR_b\,^iP_b + t_{ab} - {^iP_a} \right\|^2$$

in which the rigid transformation $^aT_b$ is determined as what minimizes a sum of squares of magnitudes of the differences between the application of the rigid transformation $^aT_b$ to the relative position $^iP_b$ in the second coordinate frame, i.e., $^aR_b\,^iP_b + t_{ab}$, and the relative position $^iP_a$ in the first coordinate frame. It is computationally efficient to solve this equation using least squares optimization, in particular nonlinear least squares optimization, in part because multiple closed-form solutions using least squares optimization exist for this general form of equation; see, e.g., Berthold K. P. Horn, *Closed-form solution of absolute orientation using unit quaternions*, 4 J. Opt. Soc. Am. A 629 (1987); K. S. Arun et al., *Least-Squares Fitting of Two 3-D Point Sets*, PAMI-9 IEEE Trans. on Pattern Analysis and Machine Intelligence 698 (1987); Berthold K. P. Horn et al., *Closed-form solution of absolute orientation using orthonormal matrices*, 5 J. Opt. Soc. Am. A 1127 (1988). The equations can be solved in a known number of computational steps, as opposed to equations without a closed-form solution, for which a solution can be approximated but is not guaranteed to and may not converge.

Next, in a block 530, the computer 42 instructs the vehicle computer 62 to store the rigid transformation in memory. When the vehicle 30 is in operation, the vehicle computer 62 uses the rigid transformation during sensor fusion to accurately combine together data about the environment from the different sensors 32, 34, 36. If the vehicle 30 is autonomous or semi-autonomous, the vehicle computer 62 can use the fused sensor data to operate the vehicle 30, e.g., braking, turning, accelerating, etc. After the block 530, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. "Substantially" as used herein means that a dimension, time duration, shape, or other adjective may vary slightly from what is described due to physical imperfections, power interruptions, variations in machining or other manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An extrinsic-calibration system comprising:
   at least one target, each target including three flat surfaces that are mutually nonparallel and a corner at which the three surfaces intersect;
   a first sensor spaced from the at least one target;
   a second sensor rigidly connected to the first sensor; and
   a computer communicatively coupled to the first sensor and the second sensor;
   wherein the computer is programmed to
      move the at least one target through at least one of a set of absolute positions;

estimate a first set of relative positions of the corner in a first coordinate frame from the first sensor, the first set of relative positions corresponding one-to-one to the set of the absolute positions of the at least one target;

estimate a second set of relative positions of the corner in a second coordinate frame from the second sensor, the second set of relative positions corresponding one-to-one to the set of absolute positions; and estimate a rigid transformation between the first coordinate frame and the second coordinate frame based on the first set of relative positions and the second set of relative positions; and estimating the rigid transformation includes determining the rigid transformation that minimizes an aggregation of errors from, for each absolute position, a difference between (a) the corresponding relative position from one of the first set or the second set and (b) application of the rigid transformation to the corresponding relative position from the other of the first set or the second set.

2. The extrinsic-calibration system of claim 1, wherein estimating the rigid transformation includes performing least squares optimization.

3. The extrinsic-calibration system of claim 1, wherein each target includes a reflector at the corner.

4. The extrinsic-calibration system of claim 3, wherein the reflector includes three reflector surfaces each mounted to a different one of the three flat surfaces, and the three reflector surfaces intersect at the corner.

5. The extrinsic-calibration system of claim 3, wherein the first sensor is a radar sensor.

6. The extrinsic-calibration system of claim 1, wherein the three flat surfaces each include a checkerboard pattern.

7. The extrinsic-calibration system of claim 6, wherein the second sensor is one of a camera or a LIDAR sensor.

8. A computer comprising a processor and a memory storing instructions executable by the processor to:
move at least one target through at least one of a set of absolute positions;
estimate a first set of relative positions of a corner of the at least one target in a first coordinate frame from a first sensor, each at least one target including three flat surfaces that are mutually nonparallel and the corner at which the three surfaces intersect, the first set of relative positions corresponding one-to-one to the set of the absolute positions of the at least one target;
estimate a second set of relative positions of the corner in a second coordinate frame from a second sensor, the second sensor rigidly connected to the first sensor, the second set of relative positions corresponding one-to-one to the set of absolute positions; and
estimate a rigid transformation between the first coordinate frame and the second coordinate frame based on the first set of relative positions and the second set of relative positions;
wherein estimating the rigid transformation includes determining the rigid transformation that minimizes an aggregation of errors from, for each absolute position, a difference between (a) the corresponding relative position from one of the first set or the second set and (b) application of the rigid transformation to the corresponding relative position from the other of the first set or the second set.

9. The computer of claim 8, wherein estimating the rigid transformation includes performing least squares optimization.

10. The computer of claim 9, wherein the least squares optimization is a nonlinear least squares optimization.

11. The computer of claim 8, wherein each target includes a reflector at the corner.

12. The computer of claim 11, wherein the reflector includes three reflector surfaces each parallel to a different one of the three flat surfaces, and the three reflector surfaces intersect at the corner.

13. The computer of claim 11, wherein the first sensor is a radar sensor.

14. The computer of claim 8, wherein the three flat surfaces each include a checkerboard pattern.

15. The computer of claim 14, wherein estimating the second set of relative positions includes determining an intersection point of the three flat surfaces.

16. The computer of claim 14, wherein the second sensor is one of a camera or a LIDAR sensor.

17. The computer of claim 8, wherein the at least one target is one target, and the instructions further include instructions to move the target through the set of the absolute positions.

18. The computer of claim 8, wherein the first sensor is one of a camera, a LIDAR sensor, or a radar sensor, and the second sensor is a different one of a camera, a LIDAR sensor, or a radar sensor than the first sensor is.

19. A method comprising:
providing at least one target, each target including three flat surfaces that are mutually nonparallel and a corner at which the three surfaces intersect;
providing a first sensor and a second sensor rigidly connected together;
moving the at least one target through at least one of a set of absolute positions;
estimating a first set of relative positions of the corner to the first sensor in a first coordinate frame based on data from the first sensor, the first set of relative positions corresponding one-to-one to the set of the absolute positions of the at least one target;
estimating a second set of relative positions of the corner to the second sensor in a second coordinate frame based on data from the second sensor, the second set of relative positions corresponding one-to-one to the set of absolute positions; and
estimating a rigid transformation between the first coordinate frame and the second coordinate frame based on the first set of relative positions and the second set of relative positions;
wherein estimating the rigid transformation includes determining the rigid transformation that minimizes an aggregation of errors from, for each absolute position, a difference between (a) the corresponding relative position from one of the first set or the second set and (b) application of the rigid transformation to the corresponding relative position from the other of the first set or the second set.

20. The computer of claim 17, wherein the instructions further include instructions to move the target through the set of the absolute positions by moving a robot arm to which the target is coupled.

* * * * *